Jan. 7, 1947.  G. E. GLATTHAR ET AL  2,413,704
ULTRAVIOLET STERILIZER
Filed Dec. 4, 1944
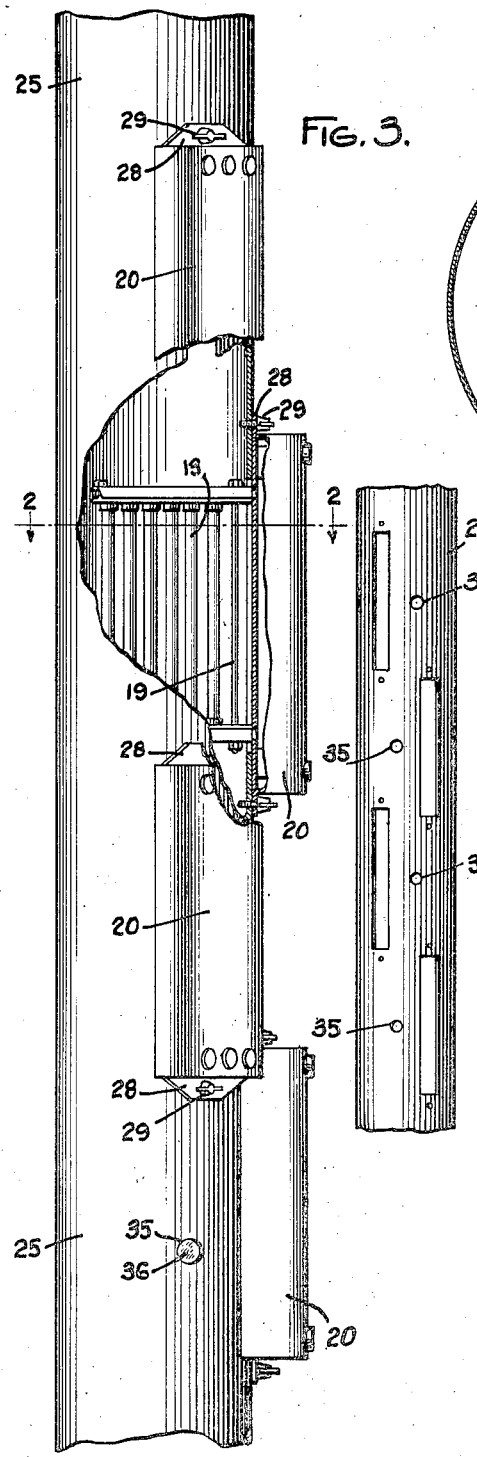
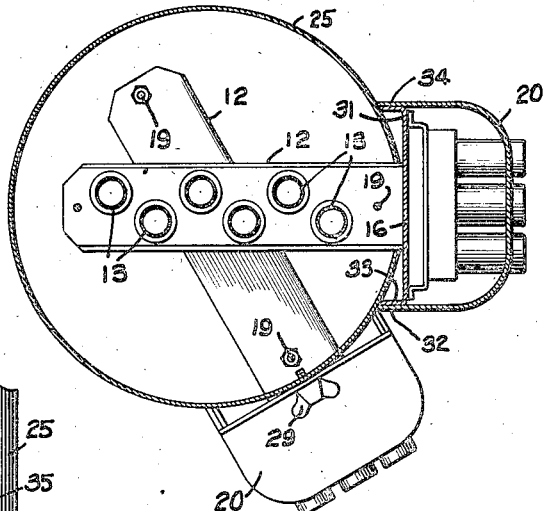
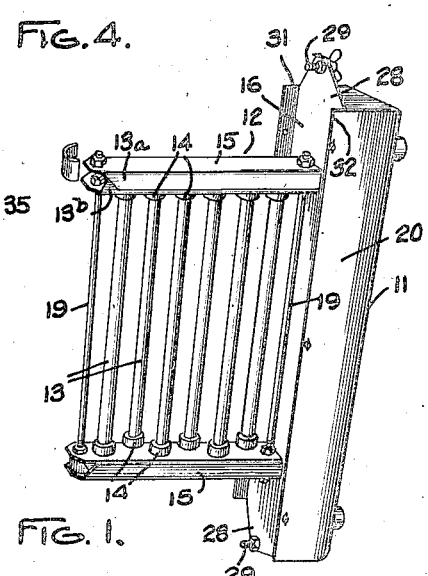
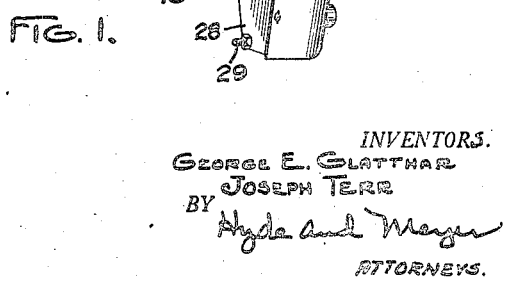
INVENTORS.
George E. Glatthar
Joseph Terr
BY Hyde and Meyer
ATTORNEYS.

Patented Jan. 7, 1947

2,413,704

UNITED STATES PATENT OFFICE 2,413,704

ULTRAVIOLET STERILIZER

George E. Glatthar, University Heights, and Joseph Terr, Cleveland Heights, Ohio, assignor to The Art Metal Company, Cleveland, Ohio, a corporation of Ohio Application December 4, 1944, Serial No. 566,457

11 Claims. (Cl. 250—42)

The invention relates to ultraviolet sterilizers or germicidal devices for use in the purification of a confined air or gas current. It is particularly related to sterilizing devices adapted for use in purifying a gaseous current in an elongated enclosure, air duct or conduit.

In preferred form the device consists of an operating unit comprising a bank of germicidal lamps carried on and by a base portion within which are housed the various auxiliary electrical accessories. While of course a single lamp may be used, the germicidal effect increases proportionally with any increase in the number of lamps, and we prefer to use a bank of lamps, wherein the number of lamps is determined by the nature, dimensions, and contour of the conduit. Such conduits, air ducts, etc., are often cylindrical, but the inventive structure here disclosed may be applied, likewise, to conduits of square, rectangular, or otherwise polygonal cross sectional contour.

An object of the invention is to provide a sterilizing unit of such contour and structural characteristics that it may be readily and rapidly mounted on the wall of the conduit or enclosure.

A further object of the invention is to provide a sterilizing unit of the nature just indicated, and wherein the lamp elements constituting the source of the germicidal radiation extend within the enclosure, while the base portion containing the necessary electrical accessories extends without the enclosure wall.

A further object of the invention is to provide a sterilizing unit of the nature indicated, and wherein the base portion thereof exceeds, in longitudinal extent, the length of the lamp elements and associated parts within the enclosure.

As a consequence of the structure defined in the last preceding paragraph, a further object of the invention is to provide a series of units of the nature just indicated, for use in tandem in an elongated, tubular, conduit, and wherein the base portions of adjoining units are mutually partially overlapped, longitudinally of the conduit, but wherein the lamp elements of said adjoining units do not overlap.

A further object of the invention is to provide, in combination with a cylindrical conduit, a series of units of the nature described, and wherein adjacent units are staggered sufficiently to permit their lapped end base portions to lie contiguously against the conduit wall, on the exterior thereof, and wherein adjacent lamp banks, on the conduit interior, extend radially inwardly at any desired angle to each other.

The specific advantages of the features just described, and further objects and advantages thereof, will be apparent on consideration of the following description of one embodiment of the invention, in conjunction with the accompanying drawing, in which:

Fig. 1 is a perspective view of a germicidal unit embodying features of the present invention;

Fig. 2 is a view in side elevation, with parts broken away showing a portion of a gas transmitting conduit, carrying a series of germicidal units thereon;

Fig. 3 is a transverse sectional view taken on the line 3—3 of Fig. 2; while

Fig. 4 is a plan view, somewhat reduced in size, showing a fragmentary portion of a conduit slotted to receive a series of germicidal units.

Before the present invention is described in detail, it is to be understood that the invention here involved is not limited to the details of construction or the exact arrangement of parts herein illustrated or described, as the invention obviously may take other forms. It also is to be understood that the phraseology or terminology herein employed is for the purpose of description and not of limitation, the scope of the present invention being denoted by the appended claims.

In sterilizing a stream of air it is quite desirable that a concentrated germicidal radiation be brought to bear on the stream, and it is obvious that this purpose is best served by multiplying to the greatest practical extent the number of germicidal energy sources within any volumetric unit of the conduit. It will be apparent to those skilled in the art that the actual germicidal efficiency will be determined by a number of factors, of which the two most important are the intensity of radiant energy concentration per unit of area in the purifying zone, and the length of time occupied by any unit volume of air in passing through the zone of purification.

In order to concentrate a plurality of sources of germicidal radiation in a zone of relatively limited cross sectional area and length we have devised a specific arrangement of units, and a specific structure and contour of each unit, so as to achieve the maximum of efficiency in a minimum space.

Referring now to the drawings, they show a germicidal unit comprising a base portion 11 and an upright portion 12 of reduced length and width. Said upright portion includes a bank of germicidal lamps 13, disposed in a manner generally similar to steps in a ladder, there being six here shown in each unit, although a greater or lesser number may be chosen for particular requirements. Each lamp is of conventional tubular form, supported at its opposed ends in sockets 14, 14. The sockets are carried in opposed paired relationship, on posts 15, 15 attached to a top plate 16 on base 11. The posts may be of any convenient structure and shape, but as here shown they are of generally rectangular, hollow cross section, each being formed from two interfitting members 13a and 13b of U-shaped section having their lateral flanges telescoped and secured together so as to provide a hollow interior extending to top plate 16, and conveniently situated with respect to sockets 14 so as to carry the necessary electrical conductors through an aperture in plate 16 to the base. Each post is closed by a cap 18 to prevent access of dirt or unwanted small objects to the electrical connections. Top and bottom tie rods 19 maintain the rigidity of the structure comprising the lamp bank, and likewise maintain the post parts 13a, 13b in operative juxtaposition. The lamp sockets 14 are of flexible type permitting ready removal of any individual lamp.

The base 11 is likewise formed from pressed sheet cooperating parts comprising a trough-like body 20 closed at its ends, and the aforesaid top plate 16 which cooperate to define a hollow enclosure for housing the conventional starters, ballasts, wiring, etc., required to initiate and maintain lamp operation. It will be understood that the top plate 16 is suitably apertured beneath the posts, for registry between the hollow interiors of base and posts, and that the base is otherwise adapted for establishing suitable electrical circuits therewithin and for providing an extension connection with the power line.

As will now appear, each unit is particularly contoured and adapted for individual application to an air duct or conduit. One such application, to a conduit of tubular, cylindrical contour is shown in Figs. 2, 3, and 4. The conduit wall 25, is provided with a series of elongated slots 26 (Fig. 4) running longitudinally, parallel to the tubular axis, each slot being circumferentially staggered with respect to the adjoining slots. Each slot is of a length and width just sufficient to receive the upright portion 12 of the unit comprising the lamps and lamp supporting elements which upright portion is inserted in the manner of a cartridge clip, as shown in Figs. 2 and 3, the portion comprising the lamps and lamp supporting elements being sometimes herein termed a clip. The purpose of the staggered arrangement of the slots is to permit the end portions of the bases of adjoining units to lie side by side, or overlap laterally (Fig. 2), and also to permit the clip assembly comprising the lamp carrying elements and the lamps to project diametrically inwardly in angular relation to adjoining clips, as best seen in Fig. 3. The overlapping end feature permits adjacent units to be placed in such manner that their respective lamp groups are almost in contact within the conduit; the angular arrangement to said lamp groups relative to each other insures a more diversified distribution of the germicidal rays in the conduit. The spacing of the slots laterally and longitudinally is such that it just permits insertion and removal of any individual unit with sufficient clearance so that the operation is not blocked by adjoining units, both as to the bases and the upright lamp holding portions thereof.

The opposite ends of the top plate 16 are provided with projecting ears 28 which carry attaching means 29 of any convenient nature for rapid connection of the unit to the conduit wall. To insure positional stability of the unit the trough portion 20 of the base wall projects upwardly on each side of top plate 16 to provide two lateral flanges 31 and 32 and the top plate is provided with complementary, upturned lateral flange 33 and 34 (Fig. 3), both of which, in cooperation with the median portion of the plate 16, provides a stable support on the cylindrical wall of the conduit as best seen in Fig. 3. The height and spacing of the flanges, or other convenient lateral projecting means, will of course be determined in view of the dimensions and contour of the conduit wall.

It will be further noted (Figs. 1 and 3) that in each unit adjacent lamps are alternately staggered with respect to an imaginary plane perpendicular to the base and intersecting said posts 15. This permits a further economy of space, provides sufficient clearance for the lamp sockets, and facilitates work on the wiring connections at the rear of the sockets.

Any desired number of sterilizing units may be placed in juxptaposition, four being here shown, each unit carrying six lamps. The number of units chosen of course depends on the irradiation concentration which is believed desirable, which in turn may depend on the cross-sectional area of the conduit, the rate of travel of the air or gas therein, and the relative contamination suspected.

In the structural arrangement shown in the drawing, any unit may be rapidly removed for cleaning, repair, or lamp replacement. If desired a temporary cover plate may be provided to seal any slot not in use. Any conduit may be readily adapted to receive any desired number of units merely by providing the appropriate number of slots at any suitable location.

The conduit wall 25 may be provided with occasional viewing apertures 35, sealed by a transparent material 36, for occasional inspection to determine whether units are operating properly. The material 36 should preferably be of such character that it does not transmit any substantial amount of germicidal radiation, since exposure to the direct effect of such radiation produces undesirable eye irritation.

An additional positive advantage of the staggered arrangement of the lamp sockets on their supporting elements, and of the angular offsetting of the several units in an assembly such as shown in Figs. 2 and 3, is that the gaseous stream is partially obstructed, and falls into eddies or similar effects of turbulence, thereby increasing the total effective exposure of each increment of gaseous stream to the germicidal radiation.

What we claim is:

1. An ultraviolet sterilizer for use with an air conduit having a slotted wall, said sterilizer comprising an elongated base for attachment to such conduit wall exteriorly thereof and of a size to completely cover the slot of such wall, a pair of spaced supporting elements substantially normal to and carried by said base for extension into the conduit through the slot thereof, a plurality of ultraviolet ray tubes extending between and supported by said elements for location within the conduit when said base is connected to the wall thereof as aforesaid, the longitudinal axes of said tubes being lengthwise of said conduit, and operating means for said tubes arranged within and carried by said base.

2. An ultraviolet sterilizer for use with an air conduit having a slotted wall, said sterilizer comprising an elongated base for attachment to such conduit wall exteriorly thereof and of a size to completely cover the slot of such wall, a pair of spaced supporting elements carried by said base for extension into the conduit through the slot thereof, a plurality of ultraviolet ray tubes extending between and supported by said elements for location within the conduit when said base is connected to the wall thereof as aforesaid, said tubes being spaced along said elements, at increasing distances from said base, in alternate staggered relation with respect to an imaginary plane bisecting said elements and normal to said base, and operating means for said tubes arranged within and carried by said base.

3. An ultraviolet sterilizer for use with an air conduit having a slotted wall, said sterilizer comprising an elongated base for attachment to such conduit wall exteriorly thereof and of a size to completely cover the slot of such wall, a pair of spaced parallel posts carried by said base for extension into the conduit through the slot thereof, a plurality of ultraviolet ray tubes extending between and supported by said posts for location within the conduit when said base is connected to the wall thereof as aforesaid, and operating means for said tubes arranged within and carried by said base, said tubes being alternately staggered on opposite sides of an imaginary plane perpendicular to said base and bisecting said posts.

4. An ultraviolet sterilizer for use with an air conduit having a slotted wall, said sterilizer comprising an elongated chambered base for attachment to such conduit wall exteriorly thereof and of a size to completely cover the slot of such wall, a pair of spaced parallel posts substantially normal to and carried by said base for extension into the conduit through the slot thereof, a plurality of ultraviolet ray tubes extending between and supported by said posts for location within the conduit when said base is connected to the wall thereof as aforesaid, and operating means for said tubes carried by said base and mounted in the chamber thereof, each said post being fabricated from a pair of elongated structural members of U-shaped cross section having their lateral flanges mutually telescoped to provide a passageway to receive the electrical conductors for the tubes, each of said post passageways being in communication with the chamber of said base.

5. An ultraviolet sterilizer for use with an air conduit having a slotted wall, said sterilizer comprising an elongated chambered base for attachment to such conduit wall exteriorly thereof and of a size to completely cover the slot of such wall, a pair of spaced parallel posts carried by said base for extension into the conduit through the slot thereof, a plurality of ultraviolet ray tubes extending between and supported by said posts for location within the conduit when said base is connected to the wall thereof as aforesaid, and operating means for said tubes mounted in the chamber of said base, each said post being fabricated from a pair of elongated structural members of U-shaped cross section having their lateral flanges mutually telescoped to provide a passageway to receive the electrical conductors for the tubes, each of said post passageways being in communication with the chamber of said base, and cap means for the open top of each said post to seal the opening thereof.

6. An ultraviolet sterlizer for use with an air conduit having a slotted wall, said sterilizer comprising an elongated chambered base for attachment to such conduit wall exteriorly thereof and of a size to completely cover the slot of such wall, a pair of spaced parallel posts normal to and carried by said base for extension into the conduit through the slot thereof, a plurality of ultraviolet ray tubes extending between and supported by said posts for location within the conduit when said base is connected to the wall thereof as aforesaid, and operating means for said tubes mounted in the chamber of said base, each said post being fabricated from a pair of elongated structural members of U-shaped cross section having their lateral flanges mutually telescoped to provide a passageway to receive the electrical conductors for the tubes, each of said post passageways being in communication with the chamber of said base, and tie means connected to and extending between said posts at the top and bottom ends thereof, whereby said respectively complementary pairs of structural post members are maintained in operative juxtaposition.

7. An ultraviolet sterilizer for use with an air conduit having a slotted wall, said sterilizer comprising an elongated base member, said base member including a top plate having a pair of upturned flanges along respectively opposed sides thereof, said base member further including a wall structure depending from said cover plate and adapted to surround and define an enclosure for the reception of suitable operating means for ultraviolet ray tubes, said sterilizer further comprising a pair of tube supporting posts attached to the aforesaid top plate, each said post being fabricated from a pair of elongated structural members of U-shaped cross section having their lateral flanges mutually telescoped to provide a hollow interior suited to receive the electrical connections for ultraviolet ray tubes, said hollow interior being in communication with said base enclosure, a plurality of ultraviolet ray tubes extending between and carried by said posts, said top plate being of a size to completely cover a slot in said slotted wall, and said upturned flanges on said top plate being in supporting contact with said slotted wall, one on each side of said wall when said posts are inserted through said slot into said conduit, said top plate being provided with means for removable attachment of said plate to said conduit.

8. Sterilizing means for subjecting a gaseous stream to irradiation by ultraviolet waves, said means comprising an elongated tubular conduit having a slot in the wall thereof, an ultraviolet wave generating unit including a hollow base portion for housing suitable electrical accessories, lamp holding means attached to and projecting from said base portion, and an ultraviolet lamp carried by said lamp holding means, said base portion being removably affixed to the outer surface of said tubular wall for ready access to said electrical accessories, and said lamp holding means extending through said slot into and transversely of said conduit, said lamp being thereby maintained wholly within said conduit and with its longitudinal axis longitudinally of the conduit, whereby a gaseous stream, passing through said conduit and past said lamp, is irradiated by ultraviolet radiation when said lamp is energized.

9. Sterilizing means for subjecting a gaseous stream to irradiation by ultraviolet waves, said means comprising an elongated tubular conduit having a series of elongated slots disposed in longitudinal juxtaposition along the wall thereof, but each slot being circumferentially staggered with respect to immediately adjoining slots, a plurality of ultraviolet wave generating units each including a hollow base portion for housing suitable electrical accessories, lamp holding means attached to and projecting from each said base portion, and an ultraviolet lamp carried by each said lamp holding means, said base portions being removably affixed along the outer surface of said tubular wall for ready access to said electrical accessories, and each said lamp holding means extending through a respective slot and into said conduit along a diameter thereof coincident with said respective slot whereby each said lamp holding means is angularly offset within said conduit with respect to immediately adjoining lampholding means, all said lamp being thereby maintained wholly within said conduit whereby a gaseous stream, passing through said conduit and past said lamps, is irradiated by ultraviolet radiation when said lamps are energized.

10. A germicidal unit for use in the sterilization of a gaseous current in an elongated conduit, said unit comprising a base, lamp supporting means attached to and projecting outwardly from said base, and a plurality of elongated, tubular, ultraviolet ray lamps removably carried on said lamp supporting means, said base being of hollow, elongated character, said lamp supporting means including a pair of spaced, parallel posts projecting from and normal to a wall of said base, one post being spaced inwardly from each end of said wall, said lamps being individually removably affixed to said posts and extending therebetween in a parallel, stepped arrangement at increasing distances from said wall of said base.

11. A germicidal unit for use in the sterilization of a gaseous current in an elongated conduit, said unit comprising a base, lamp supporting means attached to and projecting outwardly from said base, and a plurality of elongated, tubular, ultraviolet ray lamps removably carried on said lamp supporting means, said base being of hollow, elongated character, said lamp supporting means including a pair of spaced, parallel posts projecting from and normal to a wall of said base, one post being spaced inwardly from each end of said wall, said lamps being individually removably affixed to said posts and extending therebetween in a parallel, stepped arrangement at increasing distances from said wall of said base and being alternately staggered on opposite sides of an imaginary plane perpendicular to said base and bisecting said posts.

GEORGE E. GLATTHAR.
JOSEPH TERR.